United States Patent Office 3,324,011
Patented June 6, 1967

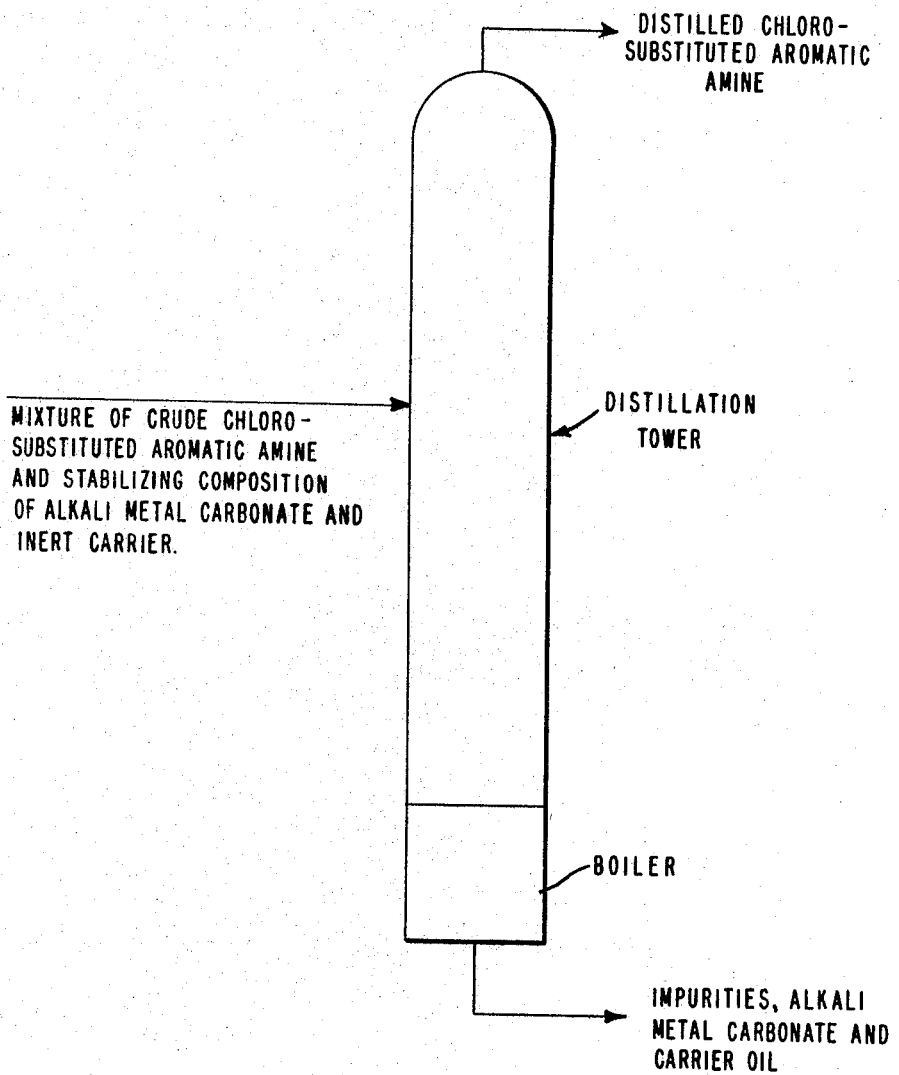

3,324,011
STABILIZATION OF CHLORO-SUBSTITUTED AROMATIC AMINES DURING THERMAL STRESS
Arthur A. Baum, Wilmington, Del., and Ronald L. Dickenson, Woodstown, N.J., assignors to E. I. du Pont de Nemours and Company, Wilmington, Del., a corporation of Delaware
Filed Nov. 1, 1963, Ser. No. 320,934
11 Claims. (Cl. 203—6)

The present invention is directed to an improved method of minimizing the thermal decomposition of chloro-substituted aromatic amines, particularly 3,4-dichloroaniline, during their recovery or purification by distillation.

The problems involved in subjecting chloro-substituted aromatic amines to thermal stress are well known and are discussed in U.S. Patent 2,911,340. For example, mono- and dichloroanilines partially decompose during distillation, liberating hydrogen chloride and forming tars. This liberated hydrogen chloride is not only corrosive but is believed to catalyze further decomposition which, if not controlled, can become explosive.

One method used to solve this problem is the common expedient of adding soda ash to the still charge to neutralize the hydrogen chloride. This method has major disadvantages. For example, the carbonate, insoluble in the organic amine, tends to settle out and becomes coated with side products. Hence, the carbonate becomes ineffective and does not adequately protect against the formation of hydrogen chloride and tarry residues. In U.S. Patent 2,911,340, it is proposed to stabilize the chloroaromatic amines with polyalkylenepolyamines, preferably in conjunction with an alkali metal carbonate. Such use of polyalkylenepolyamines, although constituting a significant improvement over the art and the use of soda ash itself, is nevertheless not entirely satisfactory, particularly when applied to 3,4-dichloroaniline. The stabilization problem has been found to be particularly acute with 3,4-dichloroaniline, for it is prone to decompose rapidly at temperatures above 100° C.

It is, therefore, an object of this invention to provide an improved method for stabilizing chloro-substituted aromatic amines against thermal decomposition while under thermal stress.

It is another object of this invention to suppress tar formation and dechlorination during the distillation recovery of 3,4-dichloroaniline.

These and other objects will become apparent from the following description and claims.

More specifically, the present invention is directed to an improved process for heat treating a nuclear-substituted chloro monocyclic aromatic amine, said heat treatment tending to result in the decomposition of said chloroamine with the liberation of hydrogen chloride and the formation of a tarry residue, the improvement which comprises heating said chloro-amine at temperatures of from 100 to 200° C. in the presence of a decomposition retarder consisting essentially of a dispersion of an alkali metal carbonate in a substantially inert carrier oil boiling substantially higher than the amine, said carbonate consisting substantially of particles sized below about 10 microns and being present in an amount which corresponds to from about 10 to 70% by weight of the dispersion and to from about 1 to 10% by weight of the chloroamine.

The stabilization method of this invention is applicable to the distillation of nuclear-substituted chloro-aromatic amines, particularly the commercially significant monocarbocyclic compounds, such as the mono- and dichloroanilines and toluidines, exemplified by p-chloroaniline, m-chloroaniline, o-chloroaniline, 3,4-dichloroaniline, 2,3-dichloroaniline, 2,5 - dichloroaniline, 3-chloro-o-toluidine, and 5-chloro-o-toludine. This novel method is of particular importance in the distillation of 3,4-dichloroaniline. Heretofore distillation of this compound has been impractical on a commercial scale because of its pronounced tendency to decompose at elevated temperatures. Now, in accordance with this invention, 3,4-dichloroaniline can be obtained by distillation in high purity and excellent yield.

This invention depeneds on the use as the decomposition retarder of a finely divided alkali metal carbonate dispersed in a substantially inert high boiling carrier oil. The term "an alkali metal carbonate" is meant to include the bicarbonates as well as the normal carbonates of Li, Na, K, Rb, Cs and mixtures thereof. The inexpensive sodium salts are normally used and preferred.

The carrier for the finely divided carbonate may be any oil that is normally liquid, is capable of carrying the carbonate in suspension, and is inert to the carbonate and the chloro-amine under the conditions of thermal stress. The carrier oil should, of course, be liquid at the operating temperatures, and should have a normal atmospheric boiling point of at least about 220° C., preferably above 300° C. For distillation, the carrier oil should be sufficiently higher boiling than the amine to enable the amine to be recovered free from oil if desired.

Suitable carrier oils for use in the present invention are the readily available lubricating base oils obtained by distillation of crude oil and sold under the names of mineral oils, neutral oils, cylinder oils, and bright stocks. Included are white oils and liquid petrolatum boiling within or over the range 220 to 390° C., light gas oil fractions boiling from 260 to 370° C., and light lubricating oil fractions boiling from 300 to 500° C. Particularly useful are lubricating oil bright stocks, which are refined oils which consist essentially of saturated hydrocarbons having a high branched chain and naphthenic content, and do not boil at 300° C. at pressures as low as 10 mm. of Hg. The lubricating oils which find use as carrier oils in the present invention have a viscosity range of from 20 to 250 SUS at 210° F. The more preferred carrier oils have a viscosity range of from 100 to 200 SUS at 210° F.

Synthetic oils, available as lubricating base oils or as plasticizers for synthetic resins, such as the normally liquid alkyl esters of aliphatic and aromatic carboxylic acids, are also suitable as carrier oils. These esters in general, exhibit viscosities in the range of from 20 to 250 SUS at 210° F. However, these esters usually exhibit viscosities at the lower end of this viscosity range. Representative of these which may be used, having normal atmospheric boiling points above about 220° C., are dibutyl sebacate, dihexyl sebacate, dioctyl sebacate, dihexyl adipate, diisooctyl adipate, dinonyl adipate, diisodecyl adipate, diisooctyl 3,3-dimethylglutarate, di-2-ethylbutyl azelate, di-2-ethylhexyl azelate, dibutyl phthalate, dioctyl phthalate, diisooctyl phthalate, octyl decyl phthalate, di-2-ethylbutyl phthalate, di-2-ethylhexyl phthalate, and mixtures thereof.

Neither the alkali metal carbonate nor the carrier oil is satisfactory alone as a stabilizer for the chloro-amine, and it is critical that the carbonate be finely divided, with particle sizes less than about 10 microns. Particle sizes in the range 0.5 to 10 microns are readily obtained by conventional grinding techniques, for example by ball-milling as described in U.S. Patent 2,544,483. Preferred carbonate particle sizes are from 1 to 5 microns. While it may be desirable that all the carbonate particles be less than about 10 microns in size for maximum efficiency, particles of larger size may be tolerated in minor proportions. For the preparation of the alkali metal carbonate-carrier oil dispersions, mixtures in the ratio of from 10 to 70 parts by weight of the carbonate, preferably 40 to 50 parts, to from 90 to 30 parts by weight of the oil, preferably 60 to 50 parts, are readily handled. Grinding to the desired particle size and dispersing of the carbonate in the carrier oil can be facilitated by the use of oil-soluble dispersing agents, such as lecithin, zinc naphthenate, or sodium petroleum sulfonate, in amounts of from about 1 to 4% by weight based on the carbonate, as disclosed in U.S. Patent 2,544,483.

The carbonate-oil dispersions are normally employed in amounts providing between about 1 and 10 parts of the carbonate per 100 parts of the chloro-amine, preferably 2–5 parts/100 parts. Larger quantities, though operable, appear unnecessary; smaller quantities do not always provide the desired degree of stabilization, particularly with 3,4-dichloroaniline which is quite sensitive to heat.

An illustration of the present invention is contained in the accompanying drawing which forms a part of this application and illustrates an embodiment of this invention wherein a chloro-substituted aromatic amine is subjected to the thermal stress of distillation. The drawing represents a distillation tower wherein the mixture of the crude chloro-substituted aromatic amine and stabilizing composition consisting of an alkali metal carbonate and carrier oil are fed into the distillation tower as shown. Thereafter, the distilled, purified, chloro-substituted aromatic amine is taken off the top of the tower and the impurities, alkali metal carbonate and high boiling carrier oil are taken off from the bottom of the tower as shown in the drawing.

Representative examples illustrating the present invention are as follow. The examples illustrate modes of carrying the invention into effect, and the advantageous results to be obtained thereby. All parts are by weight unless otherwise specified.

The alkali metal carbonate-carrier oil dispersions designated below as stabilizer compositions 1, 2 and 3 were prepared by the ball-milling method disclosed in U.S. Patent 2,544,483. Commercial carbonate (consisting substantially of particles larger than about 70 microns) was used in the ball-milling process with a carrier oil (identified below) in the presence of about 2% by weight based on the carbonate of lecithin (dispersing aid).

*Stabilizer No. 1*

Stabilizer No. 1 was ground into a smooth dispersion and consisted essentially of 50 parts sodium carbonate, 50 parts di-2-ethylhexyl phthalate, and 1 part lecithin. Ninety percent of the ball-milled carbonate particles ranged in size from about 0.5 to 2 microns and had a mean size of about 1 micron. No more than about 10% of the particles had a size greater than 2 microns.

*Stabilizer No. 2*

Stabilizer No. 2 was also ground into a smooth dispersion and consisted essentially of 40 parts sodium carbonate, 60 parts solvent-extracted lubricating oil bright stock (having a Saybolt Universal Viscosity of 153 seconds at 210° F. and a vapor pressure of 2 mm. of Hg at 300° C.), and 0.8 part lecithin. Ninety percent of the carbonate particles ranged in size from 0.5 to 2 microns, with a mean value of about 1 micron. No more than about 10% of the particles had a larger particle size than 2 microns.

*Stabilizer No. 3*

Stabilizer No. 3 was also ground into a smooth dispersion and consisted essentially of 50 parts sodium bicarbonate, 50 parts light lubricating oil consisting by volume of 19% aromatic, 40% naphthenic and 41% paraffinic hydrocarbons, and having an initial boiling point above about 260° C., and 1 part lecithin. The ball-milled dispersed particles ranged in size from 1 to 1 to 5 microns and had a mean size of about 3 microns.

EXAMPLE I

The following test, simulating the severity of large scale plant distillations, is useful for determining the effectiveness of thermal stabilizers for chloro-substituted aromatic amines.

Mixtures consisting of 300 parts of 3,4-dichloroaniline and a thermal stabilizer as identified below were heated in glass equipment at 175 to 180° C. for about 80–90 hours, in some cases in the presence of iron nails to show the effect of iron. The heat-aged mixtures were then distilled at 40 mm. of Hg to a still pot temperature of 195° C. for recovery of the undecomposed dichloroaniline. The resulting residue was weighed, corrected for the initial weight of the added stabilizer, and residue formation calculated as weight percent of the starting dichloroaniline. Results of such tests are given in Table I.

TABLE I.—STABILIZING 3,4-DICHLOROANILINE AGAINST THERMAL DECOMPOSITION

| Test | Additive | Percent by Wt. of Dichloroaniline | Residue, percent |
|---|---|---|---|
| 1 | None | | (¹) |
| 2 | Stabilizer No. 1 | 2.5 | 0.4 |
| 3 | Stabilizer No. 1 | 2.5 | ² 6.6 |
| 4 | Stabilizer No. 2 | 3.1 | 8.9 |
| 5 | Stabilizer No. 3 | 5.0 | 7.5 |
| 6 | Sodium carbonate unground | 2.5 | 17.4 |
| 7 | Di-2-ethylhexylphthalate | 5.0 | >25 |
| 8 | 1:1 Mixture of Na₂CO₃ plus di-2-ethylhexyl phthalate, unground | 2.5 | 18.1 |
| 9 | 8:1 Mixture of Na₂CO₃ plus tetraethylenepentamine | 4.5 | ² 60.5 |

¹ Total decomposition.
² Iron nails present during heat aging and distillation.

The above data show that (a) the stabilizers of this invention (in tests 2, 3, 4 and 5) are highly effective in retarding decomposition of the heat-sensitive 3,4-dichloroaniline, (b) the ball-milled carbonate-oil combination is superior to the unground physical mixture (test 2 vs. test 8) or to the individual components making up the dispersion (tests 6 and 7), and (c) the carbonate-TEPA mixture of U.S. Patent 2,911,340 is much less effective than the stabilizing compositions of the present invention (test 9 vs. test 3).

EXAMPLE II

Para-chloroaniline crude with and without stabilizer as noted below in Table II was heat-treated according to the test described in Example I, being held first at 180° C. for 80 hours in the presence of iron nails and then distilled for recovery at 10 mm. of Hg pressure up to a still pot temperature of 180° C.

TABLE II.—STABILIZING PARA-CHLOROANILINE AGAINST THERMAL DECOMPOSITION

| Test | Additive | Percent by Weight of Parachloroaniline | Residue, percent |
|---|---|---|---|
| 1 | None | | 71 |
| 2 | 8:1 Mixture of Na₂CO₃ plus TEPA | 4.5 | 5.2 |
| 3 | Stabilizer No. 1 | 2.5 | 4.4 |

Comparison with Example I shows that the stabilizer composition of this invention is highly effective for retarding decomposition of diverse chloro-amines. It is significantly more effective than the carbonate-tetraethylenepentamine mixture of the prior art in the monochloroamine (para-chloroaniline) and markedly more so in the dichloro compound (dichloroaniline).

EXAMPLE III

A steel batch still (7500 gallon capacity) was charged with 72,600 lbs. of 3,4-dichloroaniline along with 3500 lbs. of stabilizer No. 1 (described above). A small foreshot of about 1000 lbs. (comprising 94% 3,4-dichloroaniline) was removed by distillation under vacuum (12–22 mm. of Hg pressure) over an 8-hour period at a reflux ratio of about 10:1. Then 3,4-dichloroaniline was taken off over a 48-hour period, during which time the vapor temperature ranged from 165–170° C. at pressures of from 12–22 mm. of Hg and the still pot temperatures reached a maximum of about 180° C. The substantially pure 3,4-dichloroaniline fraction amounted to 66,700 lbs., corresponding to a product recovery of 91.8%.

The distillation residue was quite fluid at 110° C. and was easily removed from the still by draining at this temperature.

The 3,4-dichloroaniline employed above was obtained by nitration of o-dichlorobenzene, followed by sweating of the nitrobody to remove the bulk of the isomeric 2,3-dichloronitrobenzene and catalytically hydrogenating to the corresponding aromatic amine. Before distilling as described above, the product consisted essentially of 3,4-dichloroaniline (98.9% on a tar-free basis, the rest comprising dichloro- and monochloroanilines), but contained 2.35% tar (HCl-insolubles), and had a freezing point of 70.0° C. The recovered product consisted essentially of 3,4-dichloroaniline, contained only 0.4% HCl-insolubles, and had a freezing point of 71.1° C.

In contrast, distillation of such 3,4-dichloroaniline under essentially the same conditions but in the presence of 0.5% by weight of tetraethylenepentamine and 2% by weight of sodium carbonate as stabilizer resulted in substantially lower product recoveries of about 77%.

It is understood that the preceding Examples are representative and may be varied within the scope of the present total specification as understood by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In a process for heat-treating a nuclear-substituted chloromonocyclic aromatic amine wherein said amine undergoes thermal stress, the improvement which comprises heating said amine at temperatures of from 100° C. to 200° C. in the presence of a decomposition retarder consisting essentially of a dispersion of an alkali metal carbonate in a substantially inert carrier oil boiling substantially higher than said amine and having a viscosity in the range of from 20 to 250 S.U.S. at 210° F., said carbonate consisting essentially of particles sized below about 10 microns and being present in an amount of from 10 to 70% by weight of said dispersion and from about 1 to 10% by weight of said amine, and said inert carrier oil being selected from the group consisting of a petroleum hydrocarbon lubricating base oil and a normally liquid dialkyl ester of a hydrocarbon dicarboxylic acid.

2. The process of claim 1 wherein said nuclear-substituted chloromonocyclic aromatic amine is selected from the group consisting of monochloroaniline and dichloroaniline.

3. The process of claim 1 wherein said nuclear-substituted chloromonocyclic aromatic amine is 3,4-dichloroaniline.

4. The process of claim 1 wherein said carbonate is present in an amount of from 40 to 60% by weight of said dispersion and from about 2 to 5% by weight of said chloro-amine.

5. The process of claim 1 wherein the alkali metal carbonate is selected from the group consisting of sodium carbonate and sodium bicarbonate and said carbonate consists essentially of particles sized from about 0.5–10 microns.

6. The process of claim 1 wherein the alkali metal carbonate is selected from the group consisting of sodium carbonate and sodium bicarbonate and said carbonate consists essentially of particles size from about 1 to 5 microns.

7. In a process for heat treating a nuclear substituted chloromonocyclic aromatic amine wherein said amine undergoes thermal stress, the improvement which comprises heating said amine at temperatures of from 100° C. to 200° C. in the presence of a decomposition retarder consisting essentially of a dispersion of an alkali metal carbonate in a normally liquid dialkyl ester of a hydrocarbon dicarboxylic acid having a viscosity of from 20 to 250 S.U.S. at 210° F., said ester boiling substantially higher than said amine, and said carbonate consisting essentially of particles sized below about 10 microns and being present in an amount of from 10% to 70% by weight of said dispersion and from about 1% to 10% by weight of said amine.

8. In a process for heat treating a nuclear substituted chloromonocyclic aromatic amine wherein said amine undergoes thermal stress, the improvement which comprises heating said amine at temperatures of from 100° C. to 200° C. in the presence of a decomposition retarder consisting essentially of a dispersion of an alkali metal carbonate in diethylhexyl phthalate, said carbonate consisting essentially of particles sized below about 10 microns and being present in an amount of from 10% to 70% by weight of said dispersion and from about 1% to 10% by weight of said amine.

9. In a process for heat treating a nuclear substituted chloromonocyclic aromatic amine wherein said amine undergoes thermal stress, the improvement which comprises heating said amine at temperatures of from 100° C. to 200° C. in the presence of a decomposition retarder consisting essentially of a dispersion of an alkali metal carbonate in a petroleum hydrocarbon lubricating base oil having a viscosity of from 20 to 250 S.U.S. at 210° F., said oil boiling substantially higher than said amine, and said carbonate consisting essentially of particles sized below about 10 microns and being present in an amount of from 10% to 70% by weight of said dispersion and from about 1% to 10% by weight of said amine.

10. In a process for heat treating a nuclear substituted chloromonocyclic aromatic amine wherein said amine undergoes thermal stress, the improvement which comprises heating said amine at a temperature of from 100° C. to 200° C. in the presence of a decomposition retarder consisting essentially of a dispersion of an alkali metal carbonate in a bright stock lubricating oil having a viscosity of from 100 to 200 S.U.S. at 210° F., said oil boiling substantially higher than said amine, and said carbonate consisting essentially of particles sized below about 10 microns and being present in an amount of from 10% to 70% by weight of said dispersion and from 1% to 10% by weight of said amine.

11. The process of claim 1 wherein said thermal stress takes place during the distillation of said chloromonocyclic aromatic amine.

References Cited

UNITED STATES PATENTS

| | | | |
|---|---|---|---|
| 2,221,692 | 11/1940 | Hickman et al. | 203—6 |
| 2,231,241 | 2/1941 | Bailey | 203—83 |
| 2,544,483 | 3/1951 | Baum | 260—2.5 |
| 2,911,340 | 11/1959 | Crawford et al. | 203—8 |
| 2,920,016 | 1/1960 | Sharr et al. | 203—32 |
| 2,979,538 | 4/1961 | Wotiz | 260—651 |

NORMAN YUDKOFF, Primary Examiner.

WILBUR L. BASCOMB, JR., Examiner.